June 17, 1969

A. FISCHER 3,449,979

GEARING ARRANGEMENT

Filed Oct. 25, 1967

Inventor:
Artur Fischer
By Michael S. Striker
Attorney

United States Patent Office 3,449,979
Patented June 17, 1969

3,449,979
GEARING ARRANGEMENT
Artur Fischer, 133 Grunmettstetterstrasse, 7241
Tumlingen, Kreis, Freudenstadt, Germany
Filed Oct. 25, 1967, Ser. No. 677,953
Claims priority, application Germany, Nov. 2, 1966,
F 50,586
Int. Cl. F16h 1/12, 1/20, 3/08
U.S. Cl. 74—421
11 Claims

ABSTRACT OF THE DISCLOSURE

The invention relates to a variable-ratio gearing arrangement comprising a support provided with passages. A drive gear is mounted on the support for rotation about a first axis defined by one of the passages. A first gear having a predetermined diameter is provided with a shaft received in one of the passages and is in meshing engagement with the drive gear. A pinion is fixed to the first gear coaxial therewith for rotation with the first gear. At least one second gear is provided with an output shaft and is arranged for rotation about a third axis in motion-transmitting relationship with the pinion. In this arrangement the various gears constitute a first gear train having a predetermined transmission ratio. The first and second gears are removably mounted and the second gear has a diameter identical with the predetermined diameter of the first gear so that the latter may be removed and the second gear substituted, in which case the second gear rotates about the axis of rotation originally utilized by the first gear and is in meshing engagement with the drive gear with which it constitutes a second gear train whose transmission ratio is different from the predetermined transmission ratio of the first gear train.

Background of the invention

The present invention relates generally to gearing arrangements, and more particularly to variable-ratio gearing arrangements. Still more specifically the present invention relates to a variable-ratio gearing arrangement which is particularly suitable, although not exclusively so, for use in conjunction with toy models.

Toy construction kits are known which comprise various building blocks with whose help the user can construct a replica of certain objects, including models of objects which in actual life are powered in one form or another, for instance vehicles, cranes and the like. To provide the necessary transmission of motion which is required if models constructed with such kits are to move or perform work in the same manner as the actual objects which are being copied, it is necessary to resort to gear arrangements. Of course, the transmission ratio which is required will vary from case to case inasmuch as it would not be economically feasible to provide a separate gear arrangement for each required transmission ratio, it is necessary that the gear arrangement which is provided for use in conjunction with such construction kits permit a variation in the transmission ratio so as to accommodate it to the requirements of a particular model.

Now it is known in the gearing art to provide variable-ratio gearing arrangements wherein such variation in the transmission ratio is effected by exchanging certain ones of the gears in the gear train for other gears. Such exchanges necessitate, however, that compensation be made in the spacing between the shafts on which, or with which the various gears of the gear train rotate. For this purpose it is known to provide compensating means which are well known in the art and which need not be specifically described here. The use of such compensating means for the purposes here in question is well known and generally very satisfactory. There is, however, an area of application where such compensating means cannot be satisfactorily employed, namely in small gearing arrangements and particularly in gearing arrangements which are to be employed in conjunction with models erected with toy construction kits. Under these circumstances, and given the limited availability of space and in some instances the types of material which must necessarily be empolyed, such elements either cannot be used at all or cannot be used to advantage because their dimensions and other factors usually make it impossible for them to withstand the forces to which they will have to be subjected.

To provide a variable-ratio gearing arrangement suitable for such applications, it is therefore necessary to find a solution wherein no compensation of the aforementioned type is necessary.

Summary of the invention

The present invention provides such an arrangement.

More particularly, the present invention provides a variable-ratio gearing arrangement which overcomes the disadvantages which have been outlined and which is highly advantageous.

The variable-ratio gearing arrangement according to the present invention makes it possible to construct a variety of gear trains each having a different transmission ratio.

The necessity for providing compensatory means is eliminated with the present invention, and this not only significantly reduces the complexity and therefore expense of such an arrangement but makes it possible for the first time to use such an arrangement advantageously in the applications which have been mentioned and wherein the aforementioned size and other factors previously have precluded the employment of arrangements of this type.

In accordance with one feature of my invention I provide a variable-ratio gearing arrangement which comprises a support means, a drive gear mounted on the support means for rotation about a first axis, and a first and at least one second gear. The first gear has a predetermined diameter and is mounted in meshing engagement with the drive gear for rotation about the second axis which is spaced from the first axis by a fixed distance, a coaxial pinion being fixed to the first gear for rotation therewith. The second gear is provided with an output shaft and is arranged for rotation about a third axis in motion-transmitting relationship with the pinion of the first gear. In this arrangement of the gears the same constitute a first gear train having a predetermined transmission ratio.

In accordance with the present invention the first and second gears are removably mounted on the support means and the second gear has a diameter which is identical with the predetermined diameter of the first gear, thus making it possible for the first gear to be removed and the second gear to be substituted therefor for rotation about the second axis mentioned before, and in meshing engagement with the drive gear. In this arrangement the drive gear and the second gear together constitute a second gear train whose transmission ratio is different from the predetermined transmission ratio of the first gear train.

It is to be understood, of course, that additional gears can, and ordinarily will be provided in such a gearing arrangement, and that this does not change the inventive concept. The invention is applicable and operable as long as the diameters of the driving gears, or those of the driven gears are identical because this avoids the necessity for compensating changes in spacing between the axes of the various gears. In fact, no such changes will occur with the arrangement according to my present invention. To effect a change in the transmission ratio it is simply necessary to eliminate the gear or gears of one or more intermediate stages and to replace them with that gear which is coupled with the output shaft. Depending upon the transmission ratio which has been selected the arrangement according to the present invention will thus have a different number of stages from case to case. It is of course clear that this arrangement necessitates that with each change in the transmission ratio, the output shaft be moved to a different position. However, this is of no consequence in the applications for which the novel arrangement is primarily intended, specifically for use in conjunction with the building blocks of toy construction kits, because the remainder of the structure can be readily accommodated to these variations. This is particularly true because no shifting in the gear ratio will occur once such a ratio has been selected, because the ratio remains constant as long as the arrangement is being used with a given model. When it is decided to use the arrangement with a different model requiring a different ratio, the arrangement is modified so as to yield the necessary different transmission ratio which latter will again remain unchanged until a new application comes along.

In certain applications it will be desired to fix the shafts carrying the gear wheels non-removably to the support on which the entire arrangement is secured. In other applications, however, it will be desired to fix the shafts removably. To facilitate this the present invention contemplates further to provide the inner cylindrical surfaces bounding the passages which are provided in the support and into which the shafts extend with radially inwardly extending projections. The accommodated portions of the shafts are then provided with circumferential grooves, the arrangement being such that the male coupling portions constituted by the projections will snap into the female coupling portions constituted by the grooves when the shaft or shafts is or are inserted into the respective passages. This snap-action type of coupling permits a simple but removable mounting of the shafts in the support means and at the same time guarantees that the shafts cannot accidentally become separated from the support means even if it is necessary to mount the gearing arrangement in such a manner that the shafts would normally have the tendency to fall out of the passages under the influence of gravity. If the wall of the support means which is to hold the shafts is of insufficient thickness for any reason, the passages may be only partly provided in this wall and a tubular extension, for instance in form of a hub, may be associated with each of these passages in such a manner that it is rigidly connected to the wall with its center hole coaxial with the passage in the wall and constituting an extension portion of that passage. A portion of the shaft entering the passage in the wall would then extend into the hole in the tubular extension. In that case the radially inwardly projecting portions may advantageously be located in the hole in the tubular extension, and the arrangement of the peripheral recess or groove in the shaft will then be such that it can cooperate with this projection. To facilitate snap connections and snap disconnections, it may be advantageous to axially slot the tubular extensions, that is to provide them with one or more axially extending incisions which extend from the free end of each extension in the direction towards the connected end where the same joins the wall of the support means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

*Description of the preferred embodiments*

Figures 1, 2:
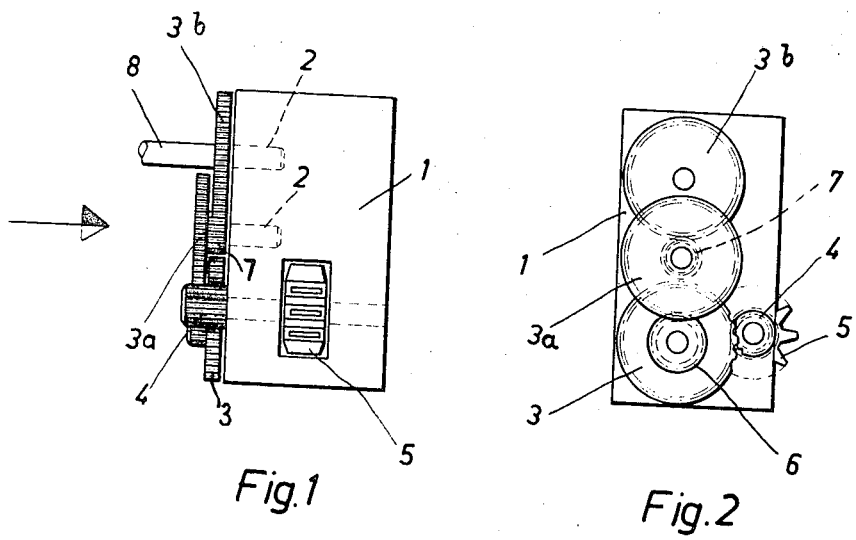
FIG. 1 is a side-elevational view of a gearing arrangement embodying my invention.
FIG. 2 is a view taken in the direction of the arrow of FIG. 1.

Discussing now the drawing in detail, and firstly FIGS. 1 and 2 thereof, it will be seen that the support means is generally identified with reference numeral 1. Such a support means may be in form of a solid block, of a housing, or of a wall portion of desired configuration. In the illustrated embodiment the support means 1 is provided in one side thereof with a plurality of inwardly extending passages 2 which, for the sake of convenience, will hereafter be assumed to be bores although they can of course be formed in any other suitable manner. The bores 2 each accommodate a shaft (not identified with a reference numeral) each of which accommodates a gear wheel.

In the embodiment illustrated the separate means 1 is assumed to be further provided with a recess communicating with one of the bores 2. Extending into this one bore is a shaft which carries a drive gear 4 and which further carries rigid with the shaft an input gear 5 located within the recess. Clearly, when the input gear 5 is driven, the drive gear 4 is similarly rotated. This, in turn, effects rotation of the gear 3 on whose shaft, coaxial with the gear 3 and fixed thereto for rotation therewith, there is located a pinion 6. A further gear 3a is in mesh with the pinion 6, and the diameter of the gear 3a is identical with that of the gear 3. As is clearly evident from FIG. 2, the gear 3a also carries fixed thereto and for rotation therewith a coaxially arranged pinion 7. An additional gear 3b, whose diameter again is identical with that of the gears 3 and 3a, meshes with the pinion 7 of the gear 3a. The gear 3b is also provided with an output shaft 8.

Operation of the arrangement described thus far will be readily understandable. In the relative positions which the various gears assume in FIGS. 1 and 2, they constitute a gear train which yields a predetermined transmission ratio. If it is now desired to change this transmission ratio, the gear 3a and the pinion 7 mounted thereon may be removed. This is then replaced with the gear 3b which, because its diameter is identical with that of the gear 3a, can be readily placed into the position originally occupied by the gear 3a and will now mesh with the pinion 6. Thus, the gears 4, 3, 6 and 3b will together constitute a gear train whose transmission ratio is different from that of the gear train illustrated in FIGS. 1 and 2. To still further vary the transmission ratio, the gear 3 with its pinion 6 may also be removed, and the gear 3b will then be substituted in its place such that it meshes with the drive gear 4.

It is clear from a consideration of the drawing and from what has been just outlined that regardless of which of the aforementioned substitutions is made, no compensation for changes in the axis of rotation becomes necessary because the axis of rotation will not change, owing to the fact that the diameters of the various gears are identical.

Figure 3:
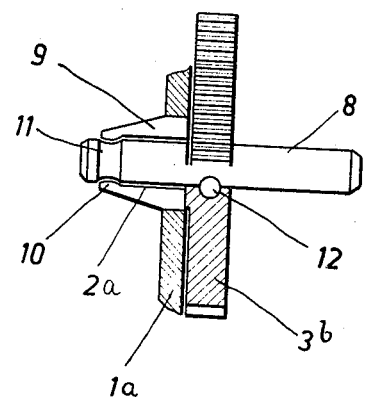
FIG. 3 is a partially sectioned detail view illustrating another feature according to my invention.

As pointed out before it may be necessary or desirable under certain circumstances that only a part of each of the passages or bores 2 be located in the support means. This is illustrated in FIG. 3 where the support means is shown as a relatively thin wall 1a whose thickness is insufficient to accommodate the entire insertable length of the respective shafts. In the embodiment of FIG. 3 I have therefore shown how a tubular extension or hub 9 is rigid with the wall 1a so that its hole or center bore is coaxial with the bore in the wall 1a and constitutes a portion of the bore 2. In fact, the extension 9 can be so arranged—and this is shown in FIG. 3—that it will be partly located within the wall 1a in which case the center hole of the extension in its entirety becomes the equivalent of the bore 2 of FIG. 1, in FIG. 3 identified with reference numeral 2a. To releasably mount the shafts in these extensions 9, of which of course there is only one shown in FIG. 3, each of the shafts may be provided in the region of its inner end with a circumferential groove 11 as is illustrated by way of example on the shaft 8 shown in FIG. 3. The inner circumferential surface bounding the bore 2a is provided with one or more radially inwardly extending projections, or even with an annular bead 10 as shown in FIG. 3, and this bead or these projections will snap into the groove 11 when the shaft 8 is inserted into the bore 2a to a sufficient extent. To facilitate this connection by snap action—and subsequently a desired disconnection—the extension or hub 9 may be provided with at least one axially extending slot which may or may not extend over the entire axial length of the etxension 9. In the embodiment of FIG. 3 it is assumed that it does extend over the entire axial length and it is for this reason that the visible portions of the extension 9 are not hatched, there being no sectioning involved. The provision of the slot of course increases the resiliency of the extension 9 and thus makes it easier to effect the connection and to terminate it.

FIG. 3 also shows how the gear 3b may be connected to the shaft 8, namely by means of a pin 12 extending into the gear 3b and into the shaft 8.

It should be clearly understood that the embodiments here illustrated are by way of example only and do not by any means exhaust the possibilities inherent in the present invention. Thus it is clear that, rather than making the gear 3b with the output shaft 8 movable, it is also possible to instead make the gear 4 with the input shaft movable. In that case it will be the gear 4 which replaces various of the other gears in the same manner as discussed earlier. Furthermore, variations in the input and/or output of the gearing arrangement can be readily envisioned without departing in any way from the scope of the invention. That the support means may assume many different configurations has already been pointed out, and it is clear that the various gears may for instance be located between and secured to spaced-apart wall portions of a housing.

It will be understood that each of the elements described above, or two or more together, may also find a useful application in other types of arrangements differing from the types described above.

While the invention has been illustrated and described as embodied in a variable-ratio gearing arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A variable-ratio gearing arrangement, particularly for use in conjunction with toy models, comprising in combination, support means; a drive gear mounted on said support means for rotating about a first axis; a first gear having a predetermined diameter and being mounted in meshing engagement with said drive gear for rotation about a second axis spaced from said first axis by a fixed distance, said first gear having a coaxial pinion fixed thereto for rotataion therewith; and at least one second gear provided with an output shaft and arranged for rotation about a third axis in motion-transmitting relationship with said pinion whereby said gears constitute a first gear train having a predetermined transmission ratio, said first and second gears being removably mounted on said support means and said second gear having a diameter identical with said predetermined diameter so that said first gear may be removed and said second gear substituted therefor for rotation about said second axis and in a meshing engagement with said drive gear whereby the latter and said second gear constitute a second gear train having a transmission ratio different from said predetermined transmission ratio.

2. An arrangement as defined in claim 1, wherein said support means comprises a plurality of passages, said first and second gear each including a supporting shaft received in a respective one of said passages.

3. An arrangement as defined in claim 2, wherein said supporting shafts are fixed with said support means, and wherein said first and second gears are removably carried by the respective supporting shafts.

4. An arrangement as defined in claim 2, wherein said first and second gears are fixed with the respective supporting shafts, and wherein said supporting shafts are removably received in the respective passages with freedom of rotation relative to said support means.

5. An arrangement as defined in claim 4, wherein said passages are respectively bounded by inner cylindrical surfaces; and further comprising cooperating male and female coupling portions respectively provided on said inner cylindrical surfaces and said supporting shafts, and being engageable with a snap action.

6. An arrangement as defined in claim 5, wherein said male coupling portions are radially inwardly extending projections provided on said inner cylindrical surfaces bounding the respective passages, and said female coupling portions are circumferential grooves provided in the respective supporting shafts and adapted to receive said projections.

7. An arrangement as defined in claim 6, wherein said support means comprises a wall portion provided with said passages and having a thickness less than the length of the supporting shafts which are to be accommodated in said passages; and further comprising tubular extensions rigid with said wall portion, said tubular extensions each having a hole coaxial with and each constituting an extension portion of one of said passages.

8. An arrangement as defined in claim 7, wherein said male coupling portions are provided in the respective extension holes.

9. An arrangement as defined in claim 4, wherein said support means comprises a wall portion provided with said passages and having a thickness less than the length of the supporting shafts which are to be accommodated in said passages; and further comprising tubular extensions rigid with said wall portion, said tubular extensions each having a hole coaxial with and constituting an extension portion of one of said passages.

10. An arrangement as defined in claim 9, wherein each of said tubular extensions has a connected end rigid with said wall portion and a free end projecting from said wall portion, and wherein said tubular extensions are each slotted axially in direction from the respective free end towards the respective connected end.

11. An arrangement as defined in claim 1 wherein said drive gear includes a drive shaft, said support means being provided with a passage rotatably accommodating said drive shaft and with a recess communicating with said passage; and further comprising an input pinion fixed to said drive shaft within said recess and accessible from the exterior of the support means.

(References on following page)

References Cited

UNITED STATES PATENTS

| | | | |
|---|---|---|---|
| 2,477,441 | 7/1949 | Cole | 46—39 X |
| 3,172,666 | 3/1965 | Ryan | 46—39 X |
| 3,193,293 | 7/1965 | Schaper | 46—39 X |

DONLEY J. STOCKING, *Primary Examiner.*

L. H. GERIN, *Assistant Examiner.*

U.S. Cl. X.R.

46—39; 74—325